EBENEZER WILCOX.

Improvement in Weeding Hoes.

No. 120,408.  Patented Oct. 31, 1871.

Witnesses.  Inventor.

UNITED STATES PATENT OFFICE.

EBENEZER WILCOX, OF EAST CLEVELAND, OHIO.

IMPROVEMENT IN WEEDING-HOES.

Specification forming part of Letters Patent No. 120,408, dated October 31, 1871.

*To all whom it may concern:*

Be it known that I, EBENEZER WILCOX, of East Cleveland, in the county of Cuyahoga and State of Ohio, have invented certain new and useful Improvements in Weeding-Hoes, of which the following is a description, reference being had to the accompanying drawing making part of this specification.

Figure 1:
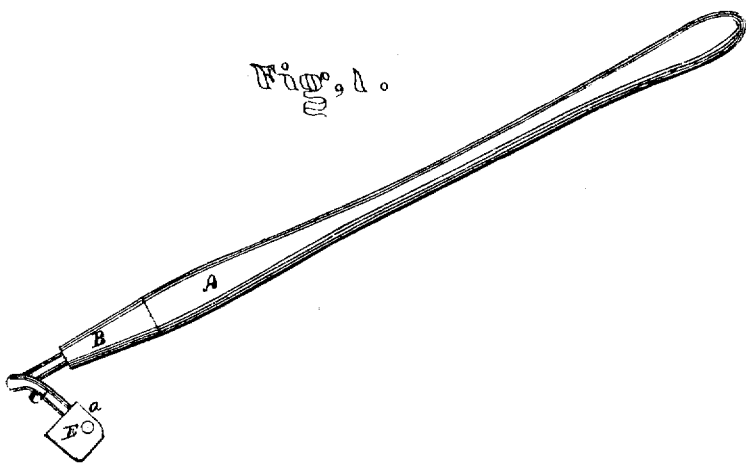
Figure 2:
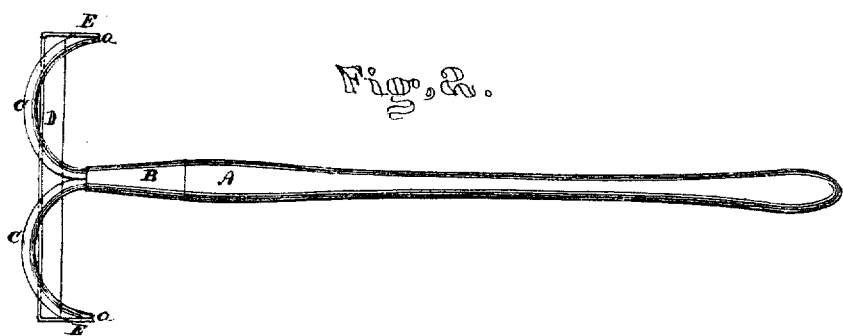
Figure 3:
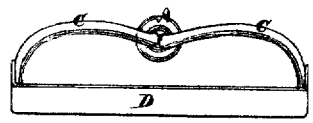

Figure 1 is a side view of the implement. Fig. 2 is a view of the upper side or back. Fig. 3 is a front view.

Like letters of reference refer to like parts in the different views.

The nature of this invention relates to a weeding-hoe; and the object thereof is to so construct said hoe that it shall easily and readily cut up the grass and weeds growing between rows of plants, and closely thereto, without disturbing the plants, leaving the dirt and weeds thoroughly broken up and lying evenly upon the ground.

The construction and working of the hoe is as follows:

In the drawing, Figure 1, A represents the handle of the hoe, and which may be of any desirable length and size. In the end thereof is inserted the shank of the implement, and secured therein by a ferrule, B, as shown in the drawing. C C are a pair of bows, whereby the blade D of the hoe is attached to the shank. Said blade consists of a thin, long, and narrow strip of steel, having a sharp lower edge. Each end of said blade is turned at a right angle, forming thereby at each end a wing, Fig. 2. The lower edge and front *a* also have a sharp cutting-edge. To the inside of the wings is secured, by rivets or otherwise, the ends of the bows C, each of which sweeps upward above the upper edge of the blade, leaving a large open space between the bows and blade, as shown in Fig. 3.

The advantages of a hoe thus constructed are, first, it is much easier to work than the ordinary garden-hoe; as the blade is narrow, it holds but little dirt and weeds, and, while hoeing in the ground, the loose earth and weeds pass directly off from the blade between it and the bows, so that the operator has but little dirt to drag forward in working the implement in the ground for cutting the weeds; hence the labor of destroying the weeds is much less fatiguing, as the operator's strength is mainly spent in cutting up the weeds, and not in dragging the hoe through the ground or along the surface loaded with earth. Another important advantage consists in the wings E, by which the operator is enabled to run the implement close up to and along by the rows of plants. The front sharp cutting-edge *a* of the wings removes the grass and weeds close up to the plants, while the anterior part of the wings serves as a guard to prevent the implement from running into the rows and rooting up the plants, but which leaves each row undisturbed, with the weeds cut up and the ground disturbed on each side, leaving only a narrow strip of unhoed weeds between the plants, which is easily and quickly broken out by the fingers or otherwise.

This hoe is much lighter than the ordinary solid-plate hoe, and for all the ordinary purposes of weeding is superior to it, as it does the work more effectually by not covering the weeds with loose dirt, but leaving them exposed upon the top of the ground. It is also a safer implement in hoeing among young plants than the common hoe, as there are no sharp corners to strike into the roots of the plants, which the ordinary hoe will do without great care is exercised to prevent it.

What I claim as my improvement, and desire to secure by Letters Patent, is—

The herein-described weeding-hoe, consisting of the blade D, cutting-wings E, and bows C C, substantially in the manner as described, and for the purpose specified, as a new article of manufacture.

EBENEZER WILCOX.

Witnesses:
J. H. BURRIDGE,
D. L. HUMPHREY.